Patented Jan. 9, 1923.

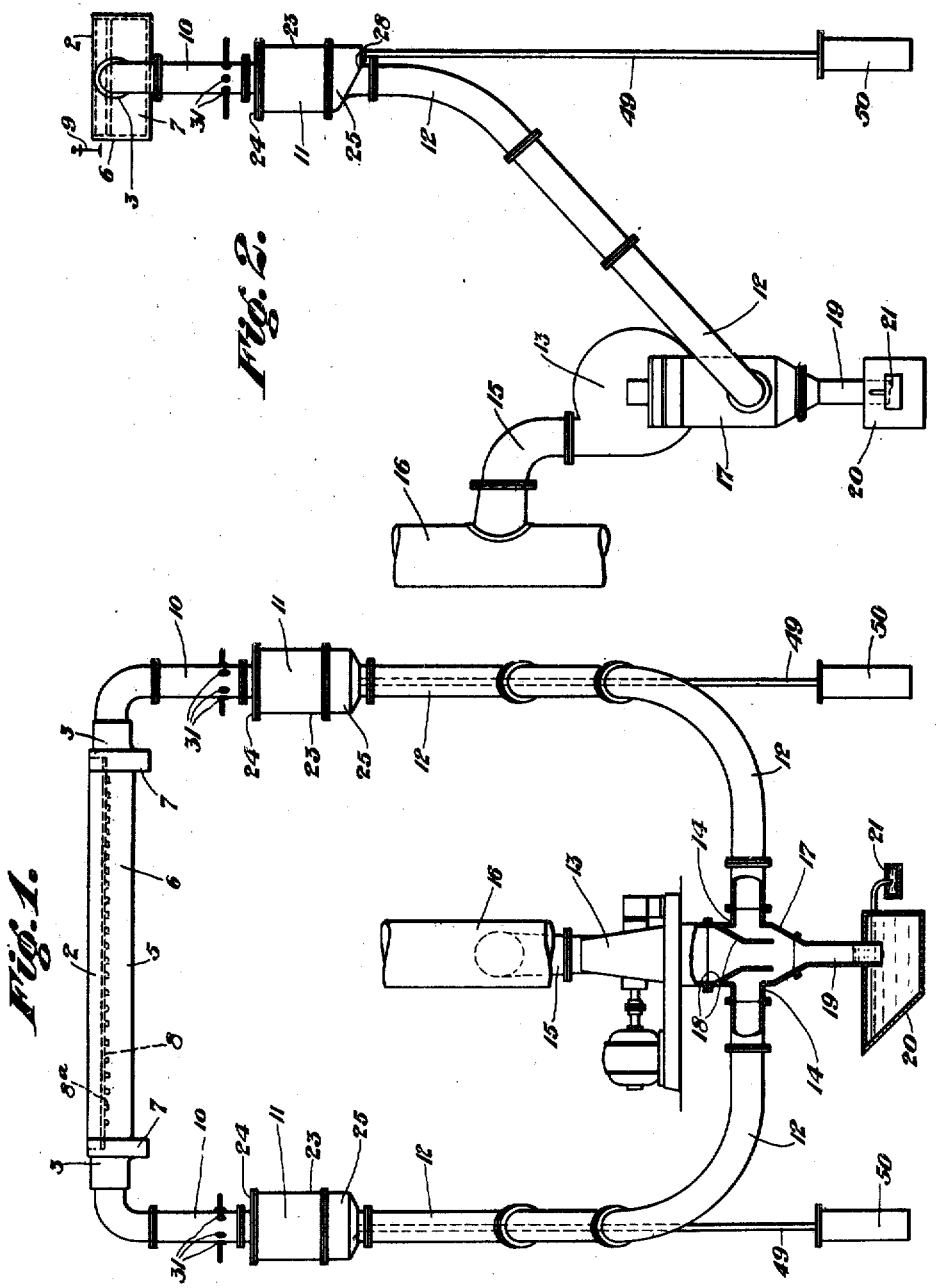

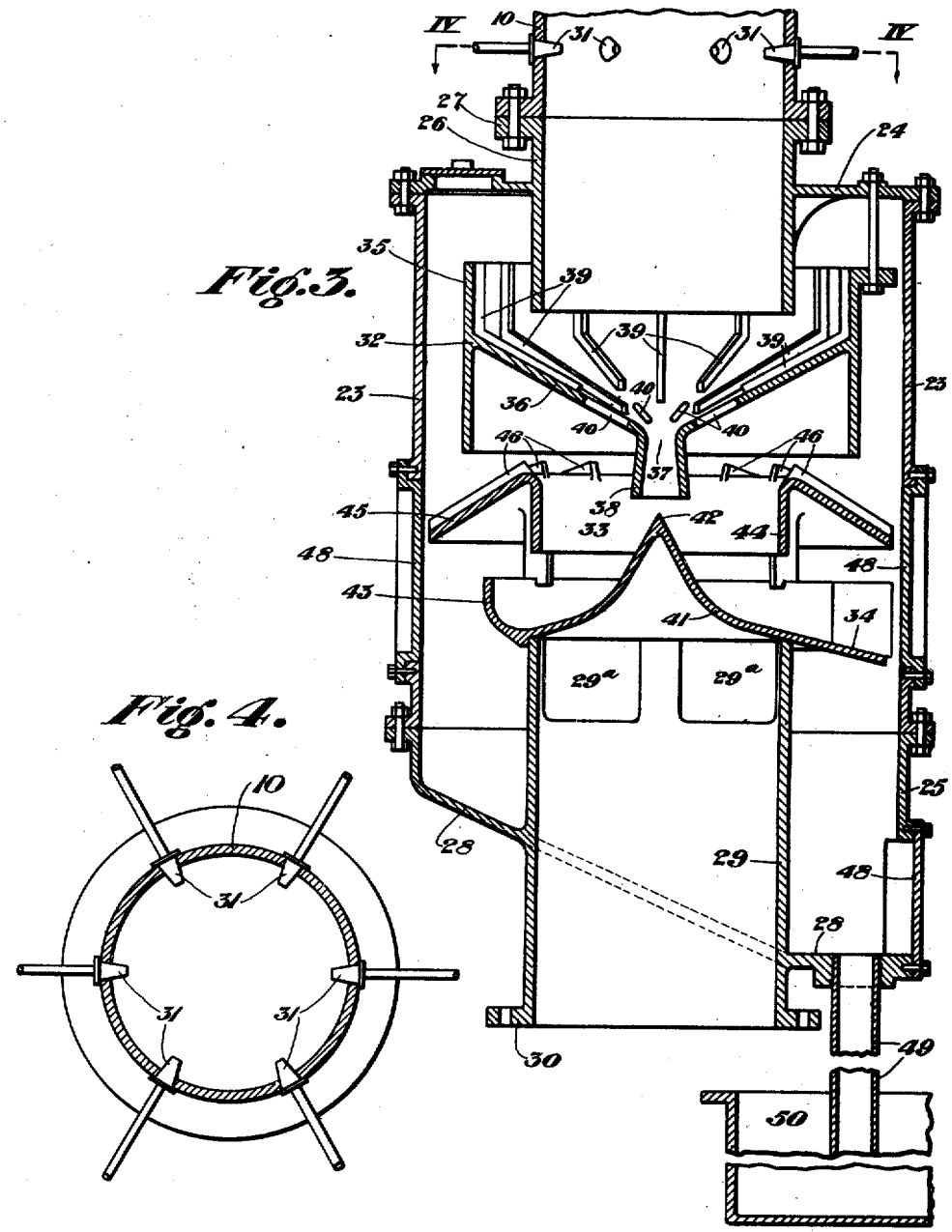

1,442,023

UNITED STATES PATENT OFFICE.

LOUIS C. EDGAR, OF SWISSVALE, PENNSYLVANIA.

SINTERING APPARATUS.

Application filed February 17, 1921. Serial No. 445,631.

*To all whom it may concern:*

Be it known that I, LOUIS C. EDGAR, a citizen of the United States, and resident of Swissvale, in the county of Allegheny and State of Pennsylvania, have invented certain new and useful Improvements in Sintering Apparatus, of which the following is a specification.

This invention relates to apparatus used in sintering flue dust, and similarly finely divided metal bearing materials, and more particularly to "down-draft" sintering apparatus operated by induced draft.

The primary object of this invention is the provision of sintering apparatus having novel means whereby the exhaust gases or products of combustion are cleaned and cooled.

Another object of the invention is to provide a sintering plant having novel means for effectively removing finely divided solids from the gaseous products of combustion, before such gaseous products reach the exhaust face of the apparatus.

A further object of this invention is to provide novel means whereby finely divided solids are removed from, and the temperature of the gases is materially lowered in the passage thereof through suitable washers, before they enter the exhaust fan.

A still further object of the invention is to provide novel means for removing the sludge and water from the washed gases before the passage of the gases through the exhaust fan, forming part of my improved apparatus.

A further object of the invention is to provide a sintering apparatus having the novel constructions, arrangements and combination of parts shown in the drawings, to be described in detail hereinafter, and to be specifically pointed out in the appended claims.

In sintering plants using an induced draft, of the constructions heretofore used, the sintering bed or pan is connected to an exhaust fan by suitable flues or piping, and an exhaust stack. The flue dust or other material to be sintered, in a finely divided state, is placed in the sintering pan. Ordinarily the grate bars forming the perforated bottom of the sintering pan are covered with a layer of refractory material, in the form of lumps, which forms a porous hearth within the sintering pan, upon which the material to be sintered is supported, and through which the burned gases are drawn by the exhaust fan in the sintering apparatus.

The upper surface of the material is leveled, and a gas burning igniter is wheeled into position above the bed of material in the sintering pan. The exhaust fan is then started, and when in operation, withdraws the products of combustion from the pan, and causes currents of air to pass through the bed of material being sintered, in quantities sufficient to support combustion and sinter the material. After the upper surface of the material within the pan becomes thoroughly ignited, the igniter is moved away. The exhaust fan continues to withdraw the products of combustion from the pan, sufficient air passing through the materials in the pan to gradually propagate the sintering operation downwardly through the mass or body of material in the pan or pans, and progressively burn the material into a sintering mass.

The burned gases or products of combustion, as drawn from the material by the exhaust fan are necessarily more or less heavily laden with fine particles of the material being sintered, and also are at a very high temperature, these factors causing the exhaust fan to become damaged quickly, and require frequent and expensive repairs, as well as costly interruptions in the operation of the sintering apparatus.

Referring now to the drawings, forming part of this specification, Figure 1 is a diagrammatic side elevation showing a sintering plant embodying the novel features of my invention.

Figure 2 is a diagrammatic end elevation of the apparatus of Figure 1.

Figure 3 is an enlarged sectional elevation through one of the gas washers forming part of my improved apparatus.

Figure 4 is a transverse sectional view on the line IV—IV of Figure 3, showing details in the construction of the gas washers of Figure 3.

In the accompanying drawings, the numeral 2 designates the sintering pan which is arranged to tilt or rock about a horizontal axis, opposite ends of this pan being provided with hollow trunnions 3—3, by which the pan is rotatably mounted in suitable trunnion bearings.

The pan 2 has a bottom 5, sides 6, 6, and integrally formed ends 7, the hollow trunnions 3—3 opening into the pan through the end walls of the pan. At an intermediate point in the height of the side walls of the pan is a series of perforated grate bars 8, these bars being held in position by transverse perforated supports 8ª.

Girders 9 which extend longitudinally along each side of the pan 2, carry flanged track rails 9ª, forming a track for charging cars and the gas igniter.

The outer ends of the hollow trunnions 3 are connected to one end of pipes 10—10, which form conduits for leading the gaseous products of combustion from beneath the grate bars 8 in the pan 2, into the gas washers 11—11 to which the other end of the pipes 10—10 are connected.

Pipes 12—12 which are connected to the lower ends of the washers 11—11, form conduits for leading the cleaned and cooled gaseous products of combustion from the gas washers to the inlet on the exhaust blower or fan 13, to which the lower end of the pipes 12—12 are connected.

The exhaust fan or blower 13 which, as shown, has two inlets 14—14 has a single outlet which is connected by a branch pipe 15 to the lower end of a stack 16, the stack being of sufficient height to carry off the products of combustion discharged thereinto by the exhaust fan.

The blower or fan 13 is provided at its lower end with a suitable trap 17, having baffles 18 arranged in front of, and extending below the inlets 14—14 of the fan so as to compel the gaseous products of combustion to travel around them in a tortuous path, thereby causing any entrained water and sludge that may be carried from the washers 11—11 to fall or flow by gravity into the pipe 19, which is connected to the lower end of the trap 17. The lower end of the pipe 19 extends downwardly into a settling tank 20, which normally is filled with water to a point above the lower end of the pipe 19, and has an overflow 21 at a point above the lower end of the pipe 19, thereby forming a water seal to prevent the escape of gases from the lower end of the pipe 19 into the surrounding atmosphere.

The washers 11—11 comprise an outer casing or wall 23, having a removable top or head 24, and a removable bottom or head member 25. The top 24 is provided with a centrally arranged inlet 26, which extends downwardly within the washer for an appreciable distance. The upper end of the inlet 26 is provided with a flange 27, connected to a flange in the end of the pipes 10—10, leading from the ends of the sintering pan 2.

The bottom 25 is provided with an inclined wall 28, and has a centrally arranged outlet 29, which extends upwardly within the washer for an appreciable distance. The wall of the conduit 9 at its upper end has a number of slots 29ª therein, forming gas inlets. The conduit 28 is provided on its lower end with a flange 30, which connects with the flanged upper end of the conduits or pipes 12.

Water is sprayed into the stream of highly heated gaseous fluid or burned gases flowing through the gas washing chamber by a series of radial nozzles 31, these nozzles being arranged in the conduit pipes 10—10 above the upper ends of the washers 11, and the baffles 32, 33 and 34 within the washer cause the said gases and water to travel through a tortuous path, and compels the gases to pass, and repass, through the falling rain of water in the travel thereof, through the washer.

The baffle 32 comprises a vertical side 35, and an integral bottom 36, the bottom being conical and being inclined toward the center of this baffle. (See Figure 3). A small centrally located outlet opening 37, in the bottom 36, has a depending tubular portion 38, and a series of ribs 39 are formed on the inner surface of the side and bottom of this wall, and converge toward the outlet opening 37 in the tubular extension 38. A plurality of narrow radial slots 40 are provided in the bottom 36 through which a portion of the water and sludge falls.

The side wall 35 of the baffle 32 is spaced from the inlet conduit 26, but extends above the lower edge of this conduit.

The third baffle 34, which is supported on the upper end of the outlet conduit 29, comprises a bottom wall 41, which inclines to one side thereof, and the central portion of the bottom 41 is projected upward in the form of a cone, its apex or peak 42 being located slightly below the lower edge of the depending tubular extension 38 on the baffle 32. An integral rim portion 43 extends around the major portion of the bottom 41, being cut away for a space along the lowermost edge of said bottom 41.

The second or intermediate baffle 33 is supported on the lower baffle 34 and comprises a tubular body 44, having a flange 45 which extends outwardly and downwardly from the upper edge of the body 44. This flange is provided on its upper surface with a plurality of radial ribs 46, and the flange 45 is only of sufficient diameter to leave a very small annular opening or space between the edge of the flange and adjoining side wall of the washer.

Suitable openings or man-holes are provided in the side walls of the washer, these openings being closed by covers or heads 48 which, when removed, permit access to the interior of the washer in making repairs and in cleaning the washer.

A sludge pipe or drain 49 is connected to an outlet at the lowest point on the bottom of the washer, this pipe extending downwardly into a settling tank 50, which normally contains water in sufficient quantity to provide a water seal for the end of the pipe.

In the operation of my improved apparatus, the gaseous products of combustion are drawn from the pan 2, through the hollow trunnions 3—3 and through the pipes 10. The gases or products of combustion, in passing through the pipes 10, are sprayed with water from the nozzles 31, and thereby cooled. The gases are drawn downwardly through the inlet 26, into the washer, the water and sludge falling on the baffle 32, and the sludge being washed through the opening 37 and the series of slots 40, and through the central opening in the baffle 33 to the lower baffle 34. The sludge formed of the finely divided solids removed from the gases by the water is washed down the sloping bottom of the baffle 34, and falls into the bottom of the washer and out of the path of the gases.

The gases, as drawn through the inlet, impinge on the film of water on the bottom of the baffle 32, and a small percentage of the gases passing through the opening 37 and slots 40 with the water and sludge. However, the direction of travel of the major portion of the gaseous products of combustion will be reversed, so as to move upwardly and over the side wall 35 of the baffle 32, and then downwardly and around the lower end of the baffle 32, and over the upper edge of baffle 33, and cause it to impinge on the film of water on the bottom of the baffle 32, the gases being thereby further cooled, and more of the solid impurities being removed. The gases then pass against and over and around the baffle 34, and pass through inlet openings 29 in the wall of the upper end of the conduit 29, and pass through the conduit 29 into the pipes 12. Contact of the water with the heated products of combustion removes or washes the dust and other finely divided solids out of the gases, and also greatly lowers the temperature of the gases, and the baffles increase the effectiveness of the water by causing the gases to impinge against the water on the surfaces of the baffles.

The sludge, which is formed by the water and solids removed from the gases, is washed downwardly and is drained from the bottom of the last baffle 34, to the inclined bottom 28 of the washer. from which the sludge enters the drain pipe 49 and passes into the settling tank 50.

Any sludge and water carried through the washers by the cooled gases are trapped in passing the baffles 18 in the trap 17, and are thereby prevented from entering the blower or fan 13, with the cleaned and cooled waste gases.

The water and any slight amount of sludge removed by the baffles 18 of trap 17, pass downwardly through the pipe 19, into the settling tank 20, and overflows therefrom, through the overflow outlet on the tank 20, into the water seal 21.

The advantages of my improved apparatus will be readily apparent to those skilled in the art. The life of the blower or fan will be greatly increased, since the gaseous products will not be laden with grit and dust, to cause excessive wear on the bearings and other parts of the blower. The gaseous products of combustion will be cooled sufficiently to not warp or injure the fan or blower, and thereby increase the life of this part of the apparatus.

The dust and grit removed from the gases is collected in the form of sludge, and the waste gases passing out of the stack are in a comparatively clean state, do not destroy vegetation or injure surrounding property.

While I have described one form of apparatus embodying my invention, it will be understood that the invention is not to be limited to such arrangement, but that various changes in design, in the construction and arrangement of parts may be made without departing from the spirit of my invention as defined in the appended claims.

I claim:—

1. In a sintering plant the combination with a sintering pan, and an exhaust fan, and at least one conduct connecting said sintering pan to said fan, of means connected to said conduit between the sintering pan and exhaust fan for cooling and cleaning the products of combustion withdrawn from the pan by said exhaust fan.

2. In a sintering plant the combination with a sintering pan, an exhaust fan, and at least one conduit connecting said sintering pan with said exhaust fan, of means connected to said conduit between said sintering pan and the exhaust fan, adapted to wash and cool the products of combustion withdrawn from the sintering pan by said exhaust fan.

3. In a sintering plant the combination with a sintering pan, an exhaust fan, and at least one conduit connecting said sintering pan to said exhaust fan for drawing the products of combustion from said pan, of washing apparatus connected to said conduit between the sintering pan and the exhaust fan, adapted to wash and cool said products of combustion, means for spraying water into the products of combustion at the inlet to said washing apparatus, and means within the washers for causing the fluids to traverse a tortuous path within said washers.

4. In a sintering plant the combination of a sintering pan, a suction fan, conduits connecting said sintering pan to said fan, inlet ports for withdrawing burned gases from said pan, washing apparatus connected to said conduits between said pan and fan, adapted to wash and cool said burned gases, means for spraying water into the burned gases entering said washer, and means for removing entrained water and sludge from the washed gases, before the entrance thereof into said exhaust fan.

5. In a sintering plant the combination of a sintering pan, a suction fan, conduits connecting said sintering pan to said suction fan for withdrawing the gaseous products of combustion from said sintering pan, means connected to said conduits between said pan and the fan, adapted to wash and cool said products of combustion, and a trap in the lower portion of said blower adapted to separate entrained water and sludge from said products of combustion, before the entrance thereof to said fan, said trap having baffles extending in front of and below the inlet ports of said fan, a drain pipe for receiving the separated sludge and water, and a settling tank forming a water seal for said drain pipe.

6. In a sintering plant the combination of a sintering pan, a suction fan, conduits connecting said sintering pan to said fan, for withdrawing the gaseous products of combustion from said sintering pan, means connected to said conduits between said pan and fan adapted to wash and cool said products of combustion, means for spraying water into said products of combustion, means for separating and collecting the sludge and water from said gases, a trap in the lower portion of said fan adapted to separate entrained water and sludge from said products of combustion, before entrance of the gases to said fan, said trap having baffles extending in front of and below the inlet ports to said fan, a drain pipe for receiving the separated sludge and water, and a settling tank having a water sealed connection with said drain pipe.

7. In a sintering plant the combination with a tilting sintering pan having hollow trunnions at its opposite ends opening into said pan, a suction fan, conduits connecting said trunnions with said fan, for withdrawing the products of combustion from said pan, separators connected to said conduits, adapted to wash and cool the products of combustion withdrawn from the sintering pan, and means for spraying water into said products of combustion, before the entrance thereof to said separators.

8. In a sintering plant the combination with a sintering pan, a suction fan, conduits connecting said pan and said fan, for withdrawing products of combustion from said pan, and means for spraying water into said products of combustion, of separators connected in said conduits adapted to collect finely divided solids removed from said products of combustion by the water, said washers comprising a casing having inlet and outlet openings, a plurality of baffles within said casing to direct the flow of the products of combustion through said casing, a drain pipe on the lower end of said casing adapted to drain the collected solids and water therefrom, and a settling tank having a water sealed connection with the lower end of said drain pipe.

9. In a sintering plant the combination with a sintering pan, a suction fan, conduits connecting said pan to said fan, and means for spraying water into the products of combustion, of an impingement washer connected to said conduits between said fan and said pan, adapted to separate and remove finely divided solids from the products of combustion, said washer comprising a casing having gas inlet and outlet openings, a plurality of baffles arranged within said casing to said products of combustion, to impinge against the water covered baffles, in the travel thereof through the washer, and means for draining the collections of finely divided solids and water from said washer.

In testimony whereof, I have hereunto signed my name.

LOUIS C. EDGAR.